US006444972B1

(12) United States Patent
Datskos et al.

(10) Patent No.: US 6,444,972 B1
(45) Date of Patent: Sep. 3, 2002

(54) APPARATUS AND METHOD FOR DETECTING ELECTROMAGNETIC RADIATION USING ELECTRON PHOTOEMISSION IN A MICROMECHANICAL SENSOR

(75) Inventors: Panagiotis G. Datskos; Slobodan Rajic; Irene C. Datskou, all of Knoxville; Charles M. Egert, Oak Ridge, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/396,695

(22) Filed: Sep. 15, 1999

(51) Int. Cl.$^7$ .................................................. G01J 1/56
(52) U.S. Cl. .................... 250/216; 250/207; 250/338.4; 73/774
(58) Field of Search ................................. 250/216, 234, 250/214 R, 207, 306, 332, 338.1, 338.4, 370.01; 73/774, 777; 356/32

(56) References Cited

U.S. PATENT DOCUMENTS

| 5,923,421 A | 7/1999 | Rajic et al. |
| 5,977,544 A | 11/1999 | Datskos et al. |
| 6,118,124 A | * 9/2000 | Thundat et al. ............. 250/332 |

FOREIGN PATENT DOCUMENTS

WO    WO97/26556 A1    7/1997

OTHER PUBLICATIONS

Datskos, et al., Photoinduced and thermal stress in silicon microcantilevers, Applied Physics Letters, US, American Institute of Physcias, New York, vol. 73, No. 16, pp. 2319–2321, Oct. 19, 1998.

Datskos, et al., Detection of infrared photons using the electronic stress in metal–semiconductor cantilever interfaces, Database Inspec Online!, The Institution of Electrical Engineers, Stevenage, GB, Database accession No. 6542761, Jun. 1, 1999.

P. G. Datskos, P. I. Oden, T. Thundat, E. A. Wachter, R. J. Warmack and S. R. Hunter, *App. Phys. Letter*, 69, 2986, 1996.

* cited by examiner

Primary Examiner—Kevin Pyo
(74) Attorney, Agent, or Firm—Kilpatrick Stockton LLP; Larry A. Roberts

(57) ABSTRACT

A micromechanical sensor and method for detecting electromagnetic radiation involve producing photoelectrons from a metal surface in contact with a semiconductor. The photoelectrons are extracted into the semiconductor, which causes photo-induced bending. The resulting bending is measured, and a signal corresponding to the measured bending is generated and processed. A plurality of individual micromechanical sensors can be arranged in a two-dimensional matrix for imaging applications.

29 Claims, 5 Drawing Sheets

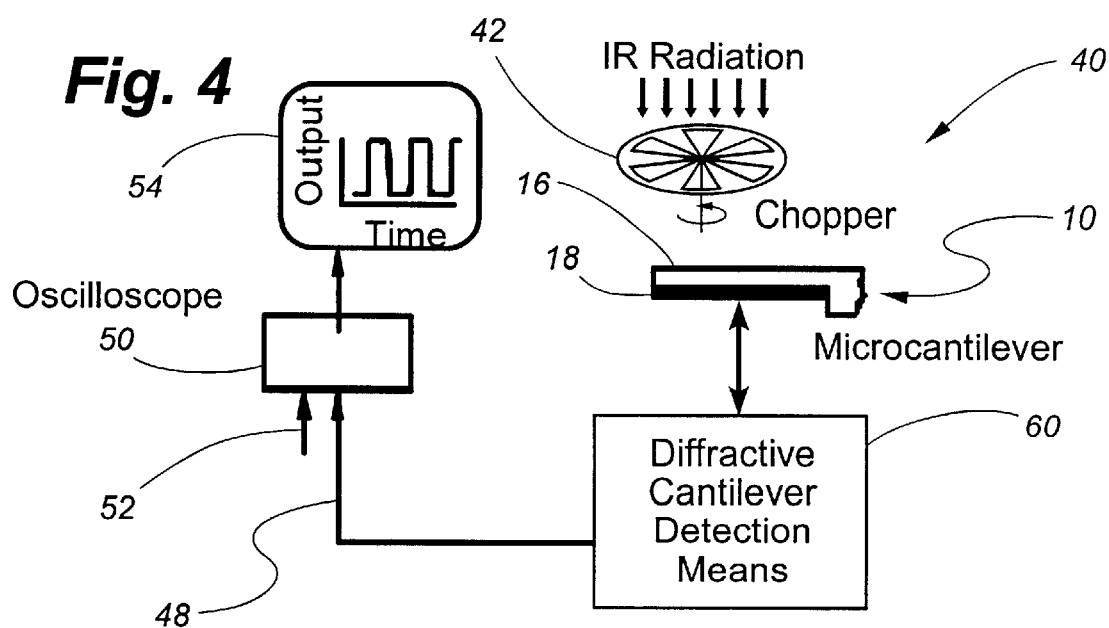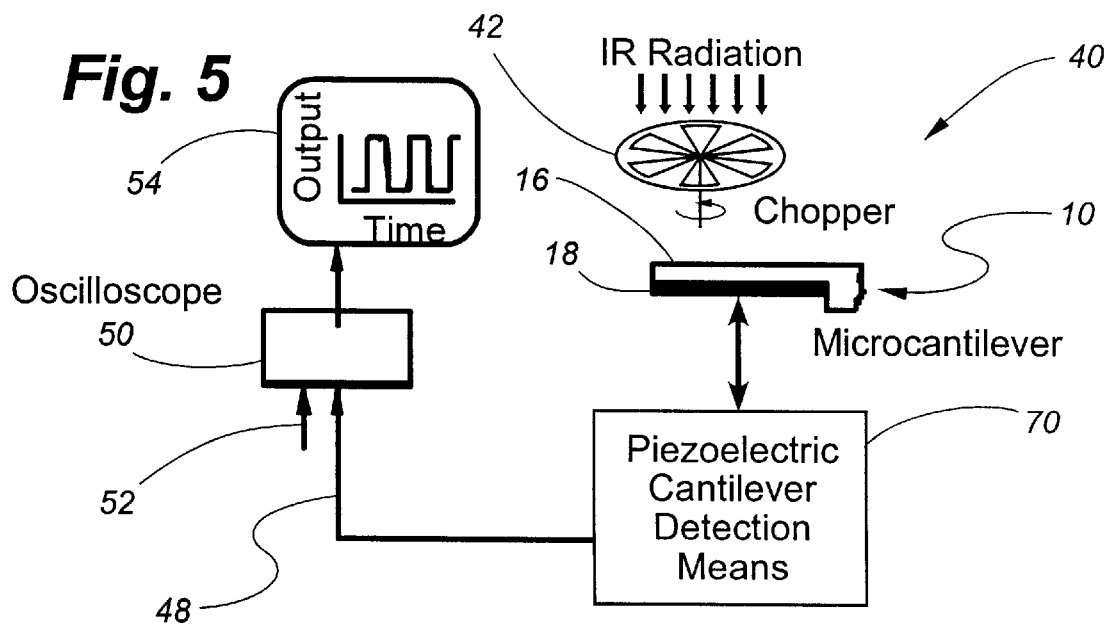

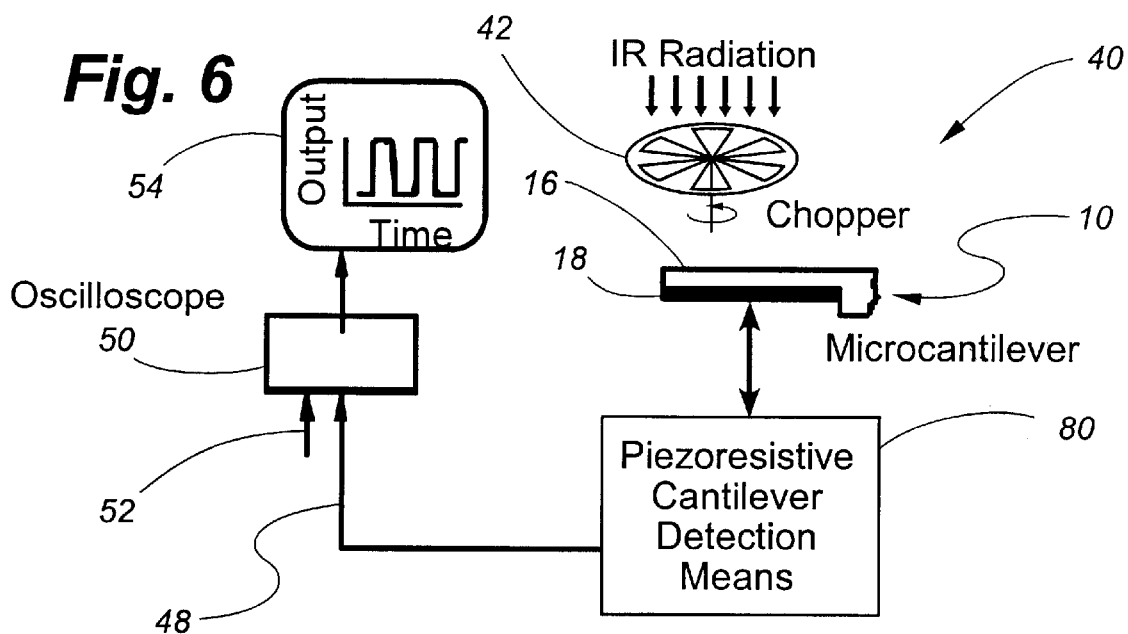
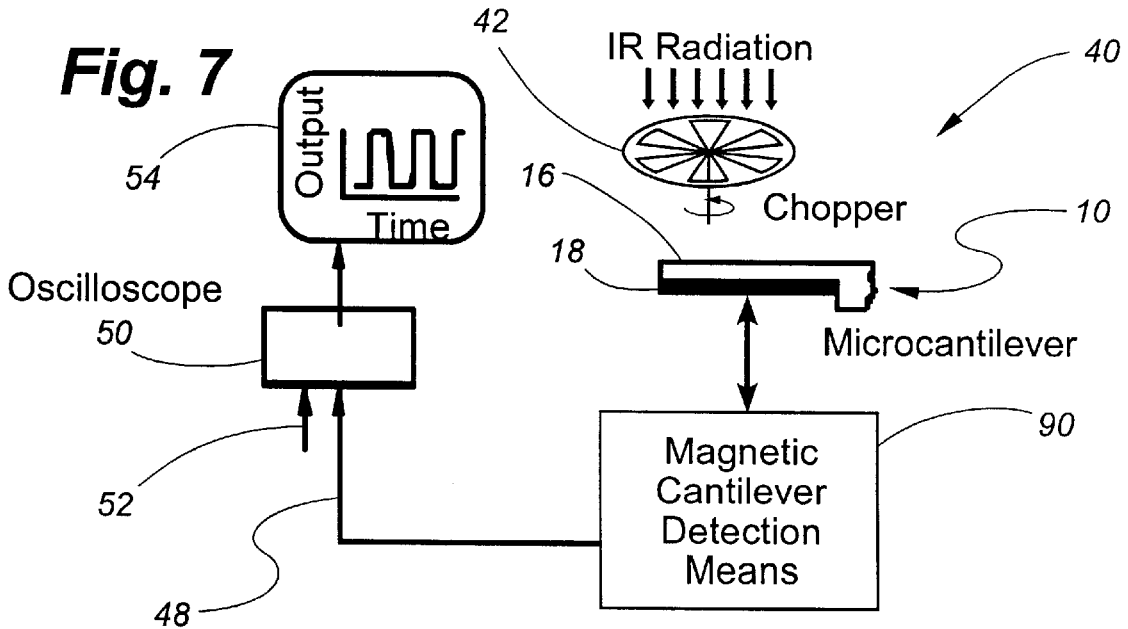

APPARATUS AND METHOD FOR DETECTING ELECTROMAGNETIC RADIATION USING ELECTRON PHOTOEMISSION IN A MICROMECHANICAL SENSOR

GOVERNMENT LICENSE RIGHTS STATEMENT

This invention was made with Government support under Contract No. DE-AC05-96OR22464 awarded by the U.S. Department of Energy to Lockheed Martin Energy Research Corp., and the Government has certain rights in this invention.

TECHNICAL FIELD

The present invention relates generally to apparatus and methods for detecting electromagnetic radiation and relates more specifically to apparatus and methods for detecting electromagnetic radiation using electron photoemission in a micromechanical sensor.

BACKGROUND OF THE INVENTION

Photon detection and imaging has extensive medical, industrial, military, and commercial applications. The detection of infrared (IR) radiation, which is the second most intense radiation source in our environment, is very important for a variety of activities both commercial and military. Detectors that can sense electromagnetic radiation in the mid-infrared region (3 to 5 µm) and in the far-infrared region (8 to 14 µm) would allow the detection of unilluminated objects that are at room temperature.

Presently there are several families of available radiation detectors, including a number of various solid state radiation detectors, such as photon detectors and thermal detectors. Currently used photon detectors are based on the principle of converting photon energy to charge carriers (electron holes) that can be detected as current or voltage. Photon detectors can attain detectivities of approximately $10^{13}$ cm $Hz^{1/2}$/W. However, photon detectors which sense a current or voltage in an applied electric field suffer significant drawbacks in the form of "dark current" effects, i.e., the current that flows through a biased semiconductor when no photons are impinging upon it. Because dark current effects are temperature sensitive, the photodetector must be cooled in order to function accurately, or other elaborate measures must be taken to counteract dark current effects. However, this cryogenic operational requirement increases the complexity and cost of such devices.

Thermal detectors, including pyroelectric, thermoelectric, resistive microbolometers, and microcantilever thermal detectors, convert radiation into heat, which is subsequently sensed as changes in the detector temperature. Among the various electromagnetic radiation detectors, the photon detector class has fast response times and high detectivities, D*. Thermal detectors have a very broadband response, since they are based upon thermal conversion of the absorbed energy.

Thus there is a need for a method and apparatus for detecting electromagnetic radiation which does not suffer "dark current" effects and has fast response times and detectivity.

There is a further need for a method and apparatus for detecting electromagnetic radiation which does not require cooling to function accurately.

There is still another need for a method and apparatus for detecting electromagnetic radiation which is not complex or costly.

SUMMARY OF THE INVENTION

Stated generally, the present invention comprises a method and apparatus for detecting electromagnetic radiation which does not suffer "dark current" effects. The method and apparatus for detecting electromagnetic radiation does not require cooling to function accurately and is neither complex nor costly to manufacture. The device provides faster response times than existing thermal detectors. In addition, the device is at least one order of magnitude more sensitive than thermal detectors. The invention comprises a compact, light-weight, highly-sensitive micromechanical photon detector that is based on MEMS (micro-electro-mechanical systems) technology. It relies on the precise measurement of electronic stress due to internal photoemission in metal semiconductor micromechanical quantum detectors (MSMQD). When an MSMQD is exposed to photons with energies above the Schottky barrier, the excess charge carriers generated induce an electronic stress, which causes a silicon microcantilever to deflect. The extent of bending is directly proportional to the radiation intensity.

Stated somewhat more specifically, in a first respect the present invention relates to a micromechanical sensor which comprises a first layer of a semiconductor material having a second layer of metal or a second semiconductor material coated thereon. When exposed to electromagnetic radiation, the material of the second layer emits photoelectrons, which are absorbed by the semiconductor material of the first layer. The excess free charge carriers produce a local mechanical strain in the semiconductor material of the first layer, causing the micromechanical sensor to deflect. This deflection can be measured as a representation of the presence of electromagnetic radiation incident on the second layer.

Thus it is an object of the present invention to provide an improved electromagnetic sensor.

Another object of the present invention is to provide an electromagnetic sensor which does not suffer the effects of "dark current."

It is another object of the present invention to provide an electromagnetic sensor which is less expensive to produce than existing sensors.

Still another object of the present invention is to provide an electromagnetic sensor which can operate at ambient temperatures and does not require expensive cooling equipment.

It is yet another object of the present invention to provide an electromagnetic sensor which provides faster response times and increased sensitivity relative to existing sensors.

Other objects, features, and advantages of the present invention will become apparent upon reading the following specification, when taken in conjunction with the drawings and the appended claims.

BRIEF DESCRIPTION OF THE DRAWINGS

FIG. 4 is a schematic view of a first alternate embodiment of a sensing device comprising the microcantilever of FIG. 1.

FIG. 5 is a schematic view of a second alternate embodiment of a sensing device comprising the microcantilever of FIG. 1.

FIG. 6 is a schematic view of a third alternate embodiment of a sensing device comprising the microcantilever of FIG. 1.

FIG. 7 is a schematic view of a fourth alternate embodiment of a sensing device comprising the microcantilever of FIG. 1.

DETAILED DESCRIPTION OF THE DISCLOSED EMBODIMENT

Figure 1:
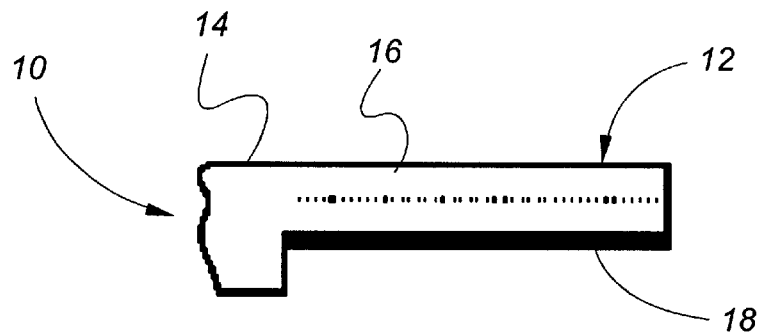
FIG. 1 is a side schematic view of a microcantilever according to the disclosed embodiment, with the microcantilever in an undeflected condition.

Referring now to the drawings, in which like numerals indicate like elements throughout the several views, FIG. 1 shows a micromechanical sensor 10. The micromechanical sensor 10 of the disclosed embodiment comprises a microcantilever 12 supported at one end 14. The microcantilever 12 comprises a first layer 16 of a semiconductor material such as silicon, germanium, or gallium arsenide. In the disclosed embodiment the first layer of semiconductor material is p-type silicon $10^2$ to $10^4$ nanometers thick, preferably around 500 nanometers thick.

The lower surface of the layer 16 of semiconductor material is coated with a coating 18 of a metal, such as gold, platinum, or iridium, or of a second semiconductor material. In the disclosed embodiment the second layer is platinum and is approximately 30 nanometers thick. The metal can be coated onto the layer 16 of semiconductor material by conventional methods such as deposition or spattering.

Once the coating 18 has been applied onto the first layer 16 of semiconductor material, the resulting structure is placed in a vacuum chamber and heated for three to four hours at a temperature of about 400–450° C. Initially $Pt_2Si$ is formed at the interface of the Si and Pt. With additional time at the annealing temperature the $Pt_2Si$ is converted to platinum silicide. In addition, the heating process reduces any residual mechanical stresses that were created as a result of the deposition process. This procedure results in a microcantilever structure with almost no residual bending in the steady state.

Figure 2:
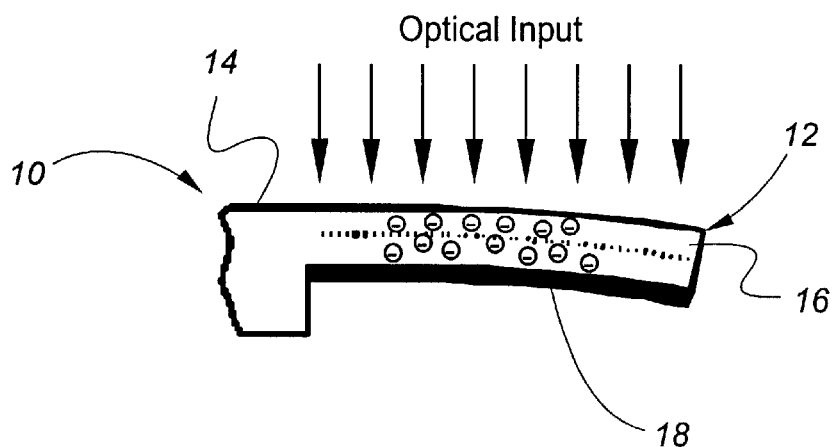
FIG. 2 is a side schematic view of the microcantilever of FIG. 1 showing the microcantilever in a deflected condition.

Referring now to FIG. 2, when exposed to an optical input such as electromagnetic radiation, the radiation passes through the semiconductor layer 16 and strikes the coating 18. The material of the coating 18 emits photoelectrons. The semiconductor material of the first layer 16 absorbs the emitted photoelectrons. These excess free charge carriers produce a local mechanical strain in the first layer 16 of semiconductor material. This mechanical strain causes the microcantilever 12 to deflect, in much the same way that a bimetallic structure deflects in response to changes in temperature. This deflection can be measured by any number of conventional means, including optical, diffractive, piezoresistive, piezoelectrical, or magnetic.

Figure 3:
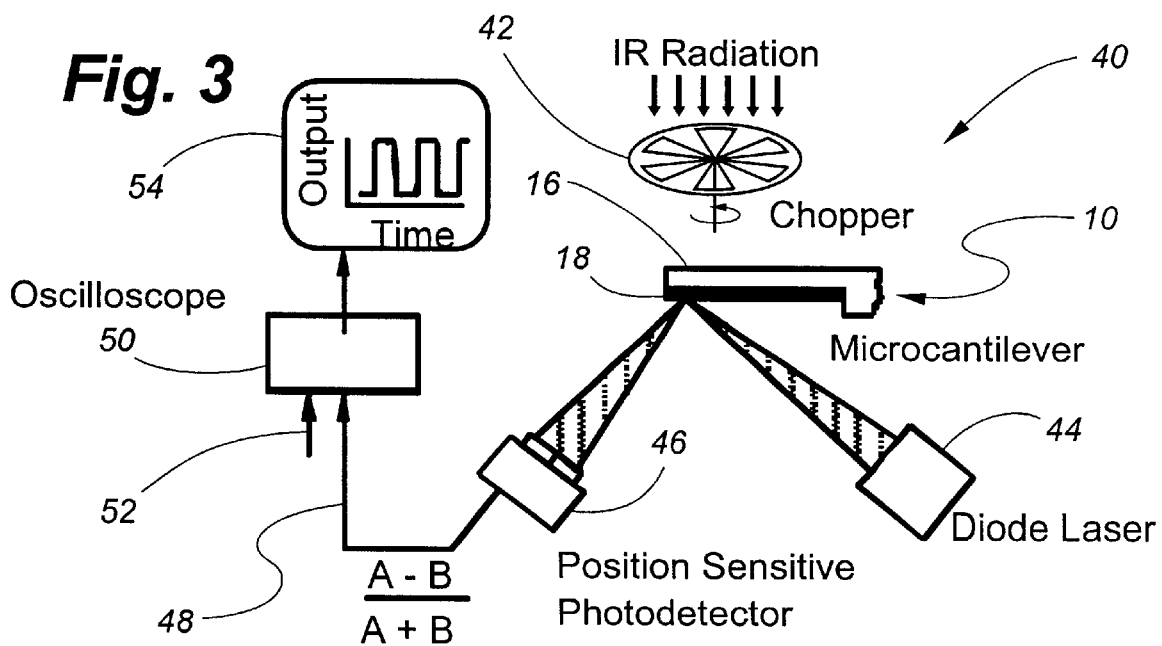
FIG. 3 is a schematic view of a disclosed sensing device comprising the microcantilever of FIG. 1.
Figure 8:
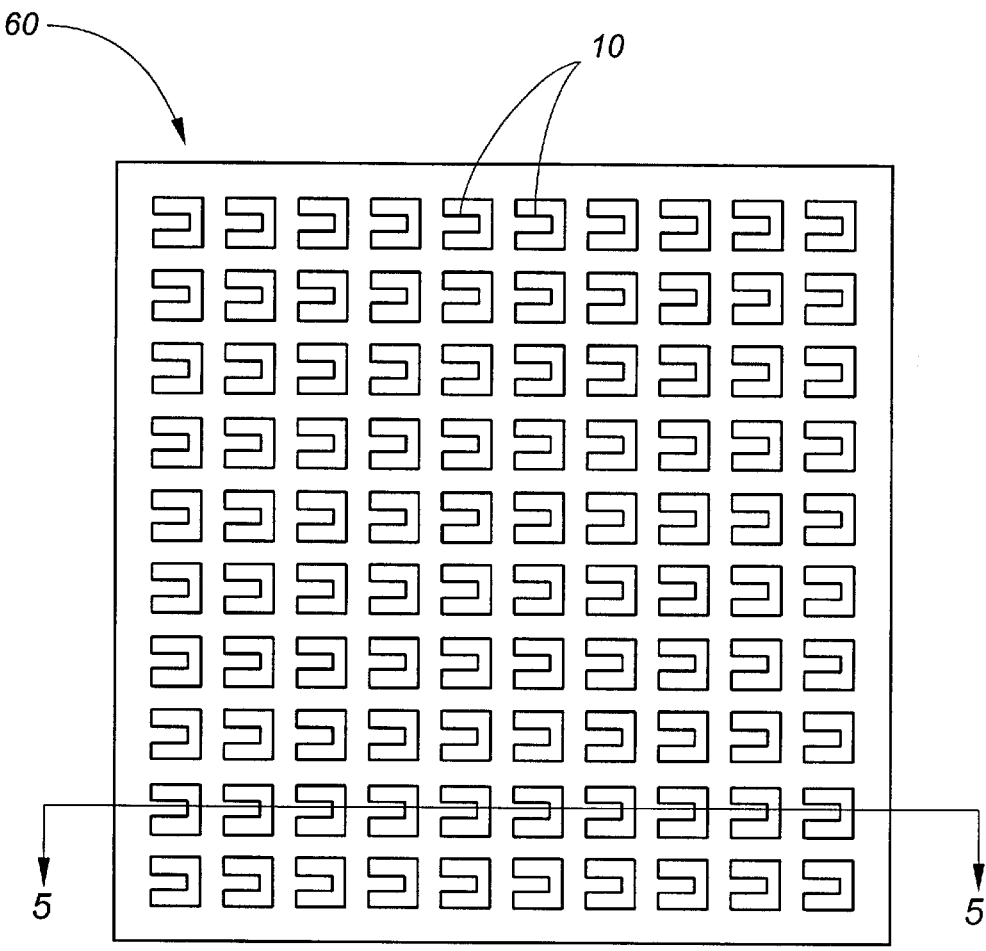
FIG. 8 is a top view of a microsensor imaging array comprising a plurality of the microcantilevers of FIG. 1 arranged in a two-dimensional array.
Figure 9:
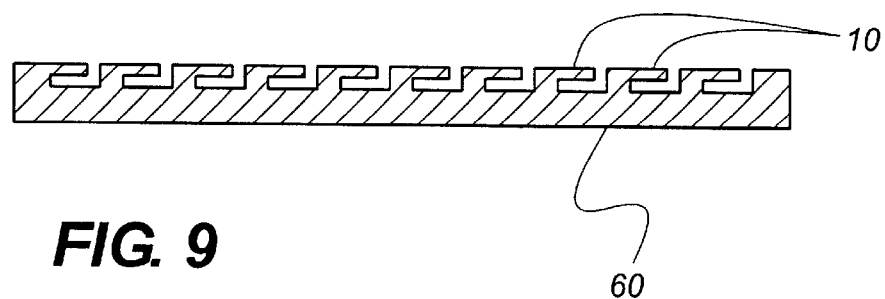
FIG. 9 is a cross-sectional view of the microsensor imaging array of FIG. 4.
Figure 10:
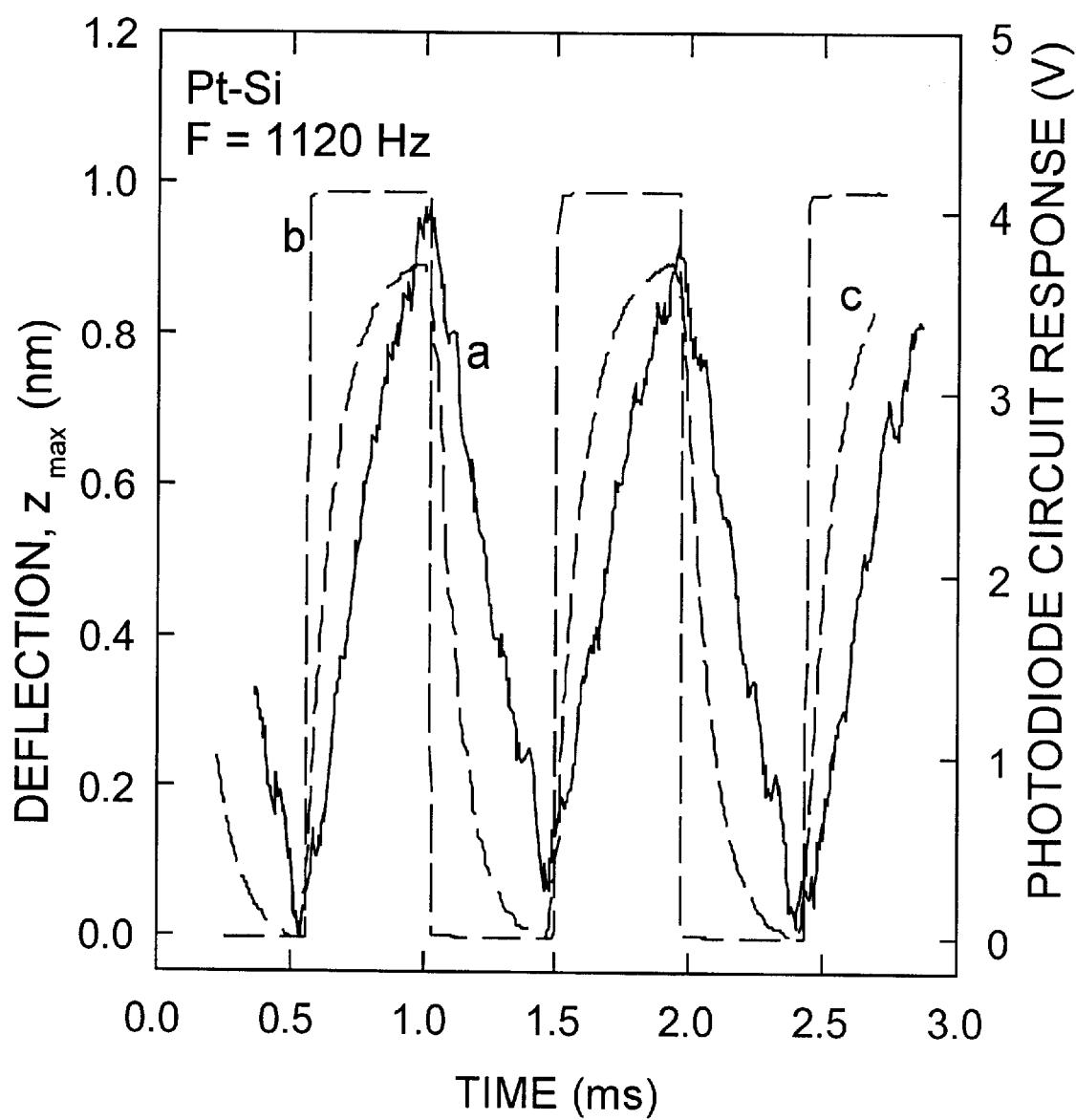
FIG. 10 is a graph plotting the deflection of a Pt—Si microcantilever as a function of time for an absorbed optical power of 20 nW.

A disclosed optical radiation sensing device 40 comprising a micromechanical sensor 10 and means for detecting the deflection of the microcantilever 12 is shown in FIG. 3. A chopper 42 chops the incoming optical input and permits the chopped input to fall onto the microcantilever 12. A means for detecting the deflection of the microcantilever includes a diode laser 44 and a position-sensitive photodetector 46. The diode laser 44 disposed beneath the microcantilever 12 directs a beam of light off the lower surface of the coating 18, which reflects it onto a position-sensitive photodetector 46. The output signal 48 from the photodetector is input into an oscilloscope 50, which serves as a means for processing the output signal 48. A reference signal 52 from the chopper 42 is also input into the oscilloscope 50. The oscilloscope 50 processes the signal and displays the output on a CRT 54 or other suitable display device.

Alternate means for detecting the deflection of the microcantilever 12 are shown in FIGS. 4–7. In FIG. 4, an alternate optical means in the form of a diffractive means 60 is employed to detect the deflection of the microcantilever 12. In FIG. 5, a piezoelectric means 70 detects changes in electrical current in response to deflection of the microcantilever 12. In FIG. 6, a piezoresistive means 80 detects changes in electrical resistance in response to deflection of the microcantilever 12. And in FIG. 7, a magnetic means 90 senses changes in a magnetic field to detect the deflection of the microcantilever 12.

FIGS. 4 and 5 illustrate the use of a plurality of micromechanical sensors 10 for imaging purposes. The sensors 10 are formed as a single unitary structure and are arranged in a two-dimensional matrix. Each sensor 10 has its own individual deflection detection means such that the bending of each individual micromechanical sensor 10 can be detected independently of the others. Each individual deflection detection means generates a discrete output signal. The output signals from the various individual deflection detection means can be processed and displayed on a CRT or other suitable display device in much the same manner as the individual pixels of a CCD on a conventional camcorder.

It will be appreciated that the metal coating 18 of the microcantilever 12 of the disclosed embodiment provides three separate functions. First, it emits photoelectrons when exposed to electromagnetic energy, which are absorbed by the semiconductor layer 16 and cause localized stresses. Second, it provides a reflective surface off which the beam from the diode laser 44 reflects. And third, the coating 18 dimensionally constrains the lower surface of the semiconductor layer 16, thereby creating the bi-material effect which causes the microcantilever 12 to deflect in response to the localized stresses. If the coating 18 were simply a second material imposed against the surface of the semiconductor layer 16, instead of being coated onto it, the second material would emit photoelectrons, which may be absorbed by the semiconductor layer 16, but the semiconductor layer would increase in size without bending. It is possible, however, that in such an instance another surface of the semiconductor layer 16, such as the top surface, could be constrained by another coating, in which case the functions of photoelectron emission and dimensional constraint may be carried out by separate structures. Similarly, a reflective surface other than the coating 18 can be provided, or the deflection of the microcantilever 12 can be detected by other than optical means, so the reflectivity of the coating 18 is not necessarily critical.

The mechanical strain is not the only force acting on the micromechanical sensor 10. Temperature changes can also create stresses in the sensor 10. The temperature-induced stresses must be subtracted from the total measured stresses to arrive at the stress attributable to incident electromagnetic radiation. This compensation can be calculated as follows.

The total change in strain due to changes in charge carrier concentration $\Delta n$ and temperature changes $\Delta T$ is the sum of the change in the photo-induced strain $\delta s_{pi}$ and thermal strain $\delta s_{th}$, viz.

$$\delta s = \delta s_{pi} + \delta s_{th} = \left(\frac{1}{3}\frac{d\varepsilon_g}{dP}\Delta n + \alpha\Delta T\right) \quad [a]$$

where $\varepsilon_g$ is the energy band gap, P is the induced pressure, and $\alpha$ is the coefficient of thermal expansion. A hole in the valence band decreases the energy of covalent bonds, while an electron adds to the bonding or antibonding energy. Therefore, depending on the sign of $d\varepsilon_g/dP$, which can be either positive or negative, there can be a competing effect between the photo-induced strain and the thermal strain.

The change in $\Delta n$ in a semiconductor film with dimensions of length l, width w, and thickness t, caused by photon flux, can be expressed as:

$$\Delta n = \eta\frac{\Delta\phi T_L}{lwt} \quad [b]$$

where $\eta$ is the quantum efficiency, $\Delta\phi$ is the number of photons per unit time, and $T_L$ is the excess carrier lifetime in the semiconductor. $T_L$ is usually $\sim 10^{-4}$s. This relationship assumes that the changes in charge carrier concentration $\Delta n$ are solely due to signal photons having a lifetime $T_L$ in the detector volume lwt.

If it is assumed that there is a circular plate with a thin film of thickness t on a substrate with thickness d at a constant temperature, the radius of curvature can be expressed as:

$$\frac{1}{R} = \frac{6(1-u)t}{d^2}\left(\frac{1}{3}\frac{d\varepsilon_g}{dP}\Delta n\right) \quad [c]$$

where u is the Poisson's ratio. Hence by measuring the radius of curvature of such a film exposed to infrared photons (e.g., by an optical or a capacitive technique), film strain can be measured, which in turn will allow the determination of $\Delta n$ and thus detect the infrared photons.

The micromechanical sensor 10 of the disclosed embodiment can be manufactured according to conventional integrated circuit fabrication techniques. Since the manufacturing process is thus well within the level of ordinary skill in the art, the process will be described herein only briefly.

Starting with a wafer of semiconductor material, a focused ion or electron beam is used to etch the wafer into a thin diaphragm. In the alternative, an electron beam can be used to expose photoresist deposited atop the semiconductor material to create a desired pattern, which can then be etched into a diaphragm. A focused ion or electron beam is then used to etch a microcantilever or other deflectable microsensing structure from the diaphragm. Imaging applications require a plurality of microsensors arranged in a two-dimensional matrix, so a plurality of microcanfilevers will be etched into a single wafer. The microcantilever or array of microcantilevers is then coated with a suitable coating material such as a metal or another semiconductor material. Where sensitivity to a particular wavelength is desired, the base semiconductor material and the coating material can be selected to provide an appropriate energy barrier between the two materials.

EXAMPLE 1

A microcantilever comprises a semiconductor layer of p-type silicon. A thin layer (30 nm) of platinum was sputtered onto one surface of the Si microcantilever using an argon ion beam. The resulting structure was placed in a vacuum chamber and heated for three to four hours at a temperature of about 400–450° C. Initially $Pt_2Si$ was formed at the interface of Si and Pt. With additional time at the annealing temperature the $Pt_2Si$ was coverted to platinum silicide. In addition, the heating process helped reduce any residual mechanical stresses that were created as a result of the deposition process. This procedure resulted in a microcantilever structure with almost no residual bending in the steady state.

The Pt—Si microcantilever was exposed to photons from a diode laser with wavelength $\lambda=1550$ nm and using a mechanical chopper, the incoming photon radiation was modulated at a frequency of 1120 Hz. Since Si is transparent to photon wavelengths above 1100 nm, 1550 nm photons can reach the interface of Pt and Si and generate photoelectrons from platinum silicide. These electrons can drift into the Si layer and cause an electronic stress. In FIG. 6 the deflection of the Pt—Si microcantilevers is plotted as a function of time for an absorbed optical power of 20 nW. The absorbed power was calculated using $\Phi_e^{abs} = \alpha_{abs}\Phi_e^{inc}A_{cant}/A_{spot}$, where $\alpha_{abs}$ is the photon absorptivity of Pt at 1550 nm, $A_{cant}$ is the cantilever area and $A_{spot}$ (=1.75 mm2) is the area. of the focused laser beam at the plane of the microcantilever. As can be seen from FIG. 6, the Pt—Si microcantilever responds rapidly to incoming photons that generate photoelectrons from the Pt—Si surface which, in turn, cause a measurable mechanical bending.

EXAMPLE 2

A microcantilever comprises a semiconductor layer of silicon upon which a layer of gold is coated. The resulting structure is baked for about two hours at a temperature of about 300–350° C. Photons with energies above 0.78 eV can produce photoelectrons from the gold surface, which are absorbed by the silicon layer and create a mechanical strain in the microcantilever.

EXAMPLE 3

A microcantilever comprising a semiconductor layer of silicon is coated with a layer of iridium. Photons with energies above 0.13 eV can produce photoelectrons from the iridium surface, which are absorbed by the silicon layer and create a mechanical strain in the microcantilever.

While the microsensing structure of the disclosed embodiment comprises a microcantilever 10, other known microsensing structures can be used, including a microbar, a microbridge, or a microplate.

In a semiconductor structure of thickness t and energy bandgap $\varepsilon_g$, the change in total surface stress due to a change in charge carriers, $\Delta n$, will be given by the photo-induced stress, $\Delta s_{pi}$, viz.

$$\Delta s_{pi} = \left(\frac{1}{3}\frac{d\varepsilon_g}{dP}\Delta n\right)E \quad [d]$$

where $d\varepsilon_g/dP$ is the pressure dependence of the energy bandgap and E is the Young's modulus. A hole in the valence band decreases the energy of covalent bonds, while an electron adds to the bonding (or antibonding) energy. Therefore there is a competing effect between the thermal and the photo-induced stress. When $d\varepsilon_g/dP$ is negative, the photo-induced stress is of opposite sign than that of the thermal stress and will tend to make the semiconductor crystal contract.

For a rectangular bar (FIG. 1) of length l, width w, and thickness t, the reciprocal of the radius of curvature, R, is given by Stoney's relationship $$\frac{1}{R} = \frac{6(1-v)}{Et}\Delta s_{pi} \quad [e]$$

where $v$ is the Poisson's ratio. Using Equation [d] the above equation [e] can be rewritten as:

$$\frac{1}{R} \approx \frac{2(1-v)}{t}\frac{d\varepsilon_g}{dP}\Delta n \quad [f]$$

The reciprocal of the radius of curvature is approximately equal to $d^2z/dy^2$. Then the maximum displacement zmax of the microcantilever is given by $$z_{max} \approx \frac{(1-v)l^2}{t}\frac{d\varepsilon_g}{dP}\Delta n \quad [g]$$

The bending of a microstructure given by Equation (4) is solely due to photo-induced surface stress. However, the overall change in $Z_{max}$ will depend on several physical and mechanical properties of the metal/semiconductor system. Assuming that an incident radiant power, $\Phi_e$, in a semiconductor microcantilever changes the number density, $\Delta n$, of excess charge carriers, we get $$\Delta n = \eta \frac{\lambda}{hc}\frac{\tau_L}{lwt}\Phi_e \quad [h]$$

where $\eta$ is the quantum efficiency, h $(=6.625\times10^{-34}$ J s$)$ is Planck's constant, c $(=3\times10^8$ m s$^{-1})$ is the speed of light, and $\tau_L$ is the lifetime of the carriers in the semiconductor. The quantum efficiency for a Schottky barrier can be described as $$\eta = c_0\frac{(hc/\lambda - \psi)^2}{hc/\lambda} = c_0\frac{hc}{\lambda}\left(1 - \frac{\psi\lambda}{hc}\right)^2 \quad [i]$$

where $C_0$ is in units of inverse energy and depends on the quantum yield and $\psi$ is the Schottky barrier height. Then the maximum displacement zmax can be rewritten as $$z_{max} = C_0\frac{(1-v)l^2}{t}\left(1 - \frac{\psi\lambda}{hc}\right)^2\frac{d\varepsilon_g}{dP}\frac{1}{lwt}\tau_L\phi_e \quad [j]$$

A deflection responsivity R=z/$\phi_e$ can be defined, viz., $$R = C_0\frac{(1-v)l}{wt}\frac{d\varepsilon_g}{dP}\left(1 - \frac{\lambda}{\lambda_c}\right)\tau_L \quad [k]$$

where $\lambda_c(=hc/\psi)$ is the cutoff wavelength for photoemission from the Schottky interface.

Since the charge carriers can be generated in a very short time the photo-induced stress can manifest itself much faster than thermal stress. The above treatment ignores the thickness of the bimaterial layer. The bending, $Z_{max}$, of bimaterial microcantilevers caused by photoemission due to incident radiant power, $\Phi_e$, can be written as:

$$z_{max} = C_0\frac{l^2}{t_1+t_2}\left(\frac{1+(t_1/t_2)^2}{3(1+t_1/t_2)^2+(1+t_1E_1/t_2E_2)(t_1^2/t_2^2+t_2E_2/t_1E_1)}\right) \quad [1]$$

$$\frac{E^1}{E^*}\times\frac{d\varepsilon_g}{dP}\frac{\tau_L}{lw(t_1+t_2)}\left(1-\frac{\lambda}{\lambda_c}\right)^2\Phi_e$$

where $t_1$, and $t_2$ are the thickness of the bimaterial layer and microcantilever substrate, l is the microcantilever length, $E_1$ and $E_2$ are the Young's moduli of the bimaterial layer and microcantilever, and E* is the effective Young's modulus of the coated microcantilever and is given by $E^*=E_1 E_2/(E_1+E_2)$. Materials with large differences in their Young's moduli will offer better deflection sensitivity. However, the larger the difference between the Young's moduli the more difficult it becomes to deposit a bimaterial layer and not produce "curled" microcantilevers. The deposition of metal layers on thin microcantilevers to produce unstressed structures with no bending is difficult and requires extremely high thermal stability. Bimaterial microcantilevers with no noticeable bending have been produced when care was taken to avoid any temperature rises during the bimaterial deposition process.

Using values found in the literature for Si ($d\varepsilon_g/dP=-2.9\times 10^{-24}$ cm$^3$, and $E_1=1.69\times10^{12}$ dyn/cm$^2$) and for Pt ($E_2=1.91 \times 1012$ dyn/cm$^2$), and assuming the absorbed power to be 1 nW, the photo-induced deflection of a Pt—Si microcantilever photon detector can be calculated from Eqn (9) as a function of photon wavelength. The Pt—Si microcantilever photon detector was given a length l=100 $\mu$m, a width w=20 $\mu$m, a thickness t =500 nm and a 30 nm Pt coating. The overall bending due to internal photoemission decreases with increasing wavelength up to the cutoff wavelength of PtSi ($\lambda_c=5.5$ $\mu$m).

As can be seen, the amount of incident energy needed to induce emission of photoelectrons depends upon the materials used. The energy barrier between two materials can be found in the literature. While two materials exhibiting a low energy barrier will result in a sensor which is more sensitive, a more sensitive sensor is also more susceptible to "dark current" effects. In addition, the cost, compatibility, and durability of the materials should be taken into account.

Deflection of the microsensor is proportional to the amount of energy striking the outer layer 18. Increased energy can take the form of either electromagnetic radiation of a shorter wavelength, electromagnetic radiation of a higher intensity, or a combination of the two. In the case of electromagnetic radiation of a shorter wavelength, the photoelectrons will have a higher kinetic energy and thus will increase the mechanical strain within the primary layer 16, resulting in bending of the microsensor. In the case of electromagnetic radiation having a higher intensity, there will be more photoelectrons emitted from the outer layer 18 and absorbed by the primary layer 16, again increasing the mechanical strain within the primary layer and resulting in bending.

The disclosed embodiment provides a number of advantages over prior art electromagnetic radiation detectors. The device is inherently simple and can be produced using existing integrated circuit fabrication techniques; thus the device can be produced far less expensively than existing photon or thermal detectors. The device provides faster response times (less than 1 $\mu$s) than existing thermal detectors. The device is at least one order of magnitude more sensitive than thermal detectors.

Further, since the change in excess charge carriers is not sensed as a change in the photoconductivity, there is no need for cooling the device to eliminate thermally generated charge carriers. The device can thus operate at ambient temperatures and does not require expensive cooling equipment.

The micromechanical spectral response can be easily tailored through the application of specific antireflective coatings and choice of material for fabrication. MEMS photon detectors can be fabricated using standard semiconductor methods and materials, and as a consequence could be mass produced at very low cost. Hence, two-dimensional cantilever arrays based on the technology described could be very attractive for a variety of applications because of their inherent simplicity, high sensitivity, and rapid response to optical radiation. While the optical readout method is useful with single element designs, practical implementation of large micromechanical arrays may require the use of other readout methods, such as diffractive, piezoresistance or capacitance. Fortunately, the MEMS technology's compatibility with a variety of readout methods also affords tremendous flexibility to potential system designers.

Finally, it will be understood that the preferred embodiment has been disclosed by way of example, and that other modifications may occur to those skilled in the art without departing from the scope and spirit of the appended claims.

What is claimed is:

1. A method for detecting electromagnetic radiation, comprising the steps of:
   directing electromagnetic radiation onto a material in contact with a deflectable structure comprised of a semiconductor to cause said material to emit photoelectrons which are absorbed by said deflectable structure so as to cause photo-induced bending of the deflectable structure; and
   measuring the photo-induced bending of the deflectable structure.

2. The method of claim 1, wherein said material comprises a metal.

3. The method of claim 2, wherein said material is selected from the group consisting of platinum, gold, and iridium.

4. The method of claim 1, wherein said semiconductor comprises a first semiconductor, and wherein said material comprises a second semiconductor.

5. The method of claim 1, wherein said deflectable structure comprises a microcantilever.

6. The method of claim 1, wherein said step of measuring the photo-induced bending of the deflectable structure comprises the steps of:
   directing a beam of light to reflect off of said deflectable structure;
   detecting changes in said reflected beam of light.

7. The method of claim 1, wherein said step of measuring the photo-induced bending of the deflectable structure comprises the step of measuring changes in a magnetic field resulting from the bending of said deflectable structure.

8. The method of claim 1, wherein said step of measuring the photo-induced bending of the deflectable structure comprises the step of measuring the change in electrical resistance within said deflectable structure as a result of said bending.

9. The method of claim 1, wherein said step of measuring the photo-induced bending of the deflectable structure comprises the steps of:
   passing a current through said deflectable structure; and
   monitoring changes in said current resulting from said bending.

10. An apparatus for detecting electromagnetic radiation, comprising:
    emitting means operative upon being exposed to electromagnetic radiation for emitting photoelectrons;
    absorbing means for absorbing photoelectrons emitted by said emitting means, said absorbing means exhibiting a dimensional change in response to absorbing said emitted photoelectrons;
    means for dimensionally constraining a surface of said absorbing means, whereby when said absorbing means exhibits said dimensional change, said absorbing means deflects; and
    means for sensing the deflection of said absorbing means;
    whereby when said means for sensing the deflection of said absorbing means senses a deflection of said absorbing means, the presence of electromagnetic radiation is indicated.

11. The apparatus of claim 10, wherein said absorbing means for absorbing photoelectrons comprises a deflectable micromechanical structure comprised of a semiconductor material.

12. The apparatus of claim 11, wherein said deflectable micromechanical structure comprises a microcantilever.

13. The apparatus of claim 10, wherein said emitting means for emitting photoelectrons comprises a metal coated onto a surface of said absorbing means.

14. The apparatus of claim 10, wherein said emitting means for emitting photoelectrons and said means for dimensionally constraining a surface of said absorbing means comprise a metal coated onto a surface of said absorbing means.

15. The apparatus of claim 13, wherein said metal is selected from the group consisting of platinum, gold, and iridium.

16. The apparatus of claim 10, wherein said means for sensing the deflection of said absorbing means comprises an optical means for detecting the modulation of a light beam in response to deflection of said absorbing means.

17. The apparatus of claim 10, wherein said means for sensing the deflection of said absorbing means comprises a diffractive means.

18. The apparatus of claim 10, wherein said means for sensing the deflection of said absorbing means comprises a piezoelectrical means for detecting changes in electrical current in response to deflection of said absorbing means.

19. The apparatus of claim 10, wherein said means for sensing the deflection of said absorbing means comprises a piezoresistive means for detecting changes in electrical resistance in response to deflection of said absorbing means.

20. The apparatus of claim 10, wherein said means for sensing the deflection of said absorbing means comprises a magnetic means for detecting a change in a magnetic field resulting from deflection of said absorbing means.

21. An imaging apparatus for electromagnetic radiation, comprising:
    a plurality of micromechanical sensors disposed in a two-dimensional array, each of said micromechanical sensors comprising a first layer of semiconductor material and a second layer of a material which emits photoelectrons when exposed to electromagnetic radiation and which dimensionally constrains a surface of said first layer, said first layers of said micromechanical sensors absorbing photoelectrons emitted by said second layers of said micromechanical sensors and undergoing a dimensional change in response thereto, said second layer dimensionally constraining a surface of said first layer such that said micromechanical sensor bends in response to a dimensional change in said first layer;

for each of said plurality of micromechanical sensors, a means for sensing bending of an associated micromechanical sensor and for generating an output signal; and means for processing said output signals from said sensing means and for outputting an image onto a display device.

22. The apparatus of claim 21, wherein said micromechanical sensors comprise microcantilevers.

23. The apparatus of claim 21, wherein said second layer of material comprises a metal coated onto a surface of said first layer of semiconductor material.

24. The apparatus of claim 23, wherein said metal is selected from the group consisting of platinum, gold, and iridium.

25. The apparatus of claim 21, wherein said means for sensing the bending of said micromechanical sensor comprises an optical means for detecting the modulation of a light beam in response to the bending of said micromechanical sensor.

26. The apparatus of claim 21, wherein said means for sensing the bending of said micromechanical sensor comprises a diffractive means.

27. The apparatus of claim 21, wherein said means for sensing the bending of said micromechanical sensor comprises a piezoelectrical means for detecting changes in electrical current in response to the bending of said micromechanical sensor.

28. The apparatus of claim 21, wherein said means for sensing the bending of said micromechanical sensor comprises a piezoresistive means for detecting changes in electrical resistance in response to the bending of said micromechanical sensor.

29. The apparatus of claim 21, wherein said means for sensing the bending of said micromechanical sensor comprises a magnetic means for detecting a change in a magnetic field resulting from the bending of said micromechanical sensor.

* * * * *